United States Patent
Morrow

(10) Patent No.: US 7,147,264 B2
(45) Date of Patent: Dec. 12, 2006

(54) COVER SYSTEM FOR A TRANSFER TRAILER

(75) Inventor: Michael J. Morrow, Indianapolis, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 11/328,271

(22) Filed: Jan. 9, 2006

(65) Prior Publication Data

US 2006/0113820 A1 Jun. 1, 2006

Related U.S. Application Data

(63) Continuation of application No. 10/732,440, filed on Dec. 9, 2003, now Pat. No. 6,983,975.

(51) Int. Cl.
*B60P 7/02* (2006.01)
(52) U.S. Cl. ............... 296/100.1; 296/101; 105/377.06
(58) Field of Classification Search ........... 296/100.06, 296/100.07, 101, 100.1; 105/377.05, 377.06
See application file for complete search history.

(56) References Cited

U.S. PATENT DOCUMENTS 4,627,658 A * 12/1986 Vold et al. ............... 296/100.1
6,402,224 B1 * 6/2002 Monaco et al. .......... 296/100.1

* cited by examiner

*Primary Examiner*—Dennis H. Pedder
(74) *Attorney, Agent, or Firm*—Maginot, Moore & Beck LLP

(57) ABSTRACT

A cover system (10) for an open-topped container, such as a transfer trailer (T), includes a cover (11) carried by a support frame (13) pivotably mounted to the container. The support frame includes a triangular construct (20) at the opposite ends of the container to improve the rigidity of the cover system. A continuous drive shaft (28) extends along the length of the container and is connected to the support frame. A drive assembly (15) rotates the continuous drive shaft to pivot the cover between retracted and deployed positions. The drive assembly is reversible to accommodate covers mounted on either side of the container.

13 Claims, 7 Drawing Sheets

COVER SYSTEM FOR A TRANSFER TRAILER

CROSS-REFERENCE TO RELATED APPLICATION

This application claims the benefit of earlier filed and application Ser. No. 10/732,440, filed on Dec. 9, 2003, and which issued on Jan. 10, 2006, as U.S. Pat. No. 6,983,975.

BACKGROUND OF THE INVENTION

The invention generally relates to covers over the openings of large containers, such as transfer trailers. The invention further relates to a control mechanism for opening and closing such covers.

Many different types of large containers are used for hauling loads and waste, such as solid waste, construction debris, landscape materials, recyclables, etc. One such type is a trailer designed for hauling by trucks, known as "transfer trailers". Transfer trailers are typically rectangular-shaped with open tops and end doors. In a typical application, refuse is loaded into the container through the open top and the load conveyed to a dump or other discharge facility. The front of the trailer is disengaged from the hauling truck and tilted upward so that the refuse can be discharged through the open end doors.

Covers over the open tops are typically provided to prevent the load from spilling, sliding or being blown out the top of the container during transport. These covers have taken various forms in the past, including tarpaulin, lightweight nylon doors, open mesh plastic screens, etc. Some past trailer cover doors have consisted of two half-doors each rotating about a pivot point located adjacent each sidewall of the trailer. However, the doors may be 45 feet in length, and may each weigh 400 pounds, for example. Thus, the doors may be too heavy to manually open and close, and for this purpose power mechanisms have been employed. While flexible covers, such as mesh covers, are usually light enough for manual deployment, they are extremely cumbersome to maneuver and susceptible to accidental deployment due to wind gusts. Thus, separate power mechanisms are also beneficial for opening and closing flip tops of all kinds.

Known rotation control mechanisms for flip tops have disadvantages. They do not maintain control of the cover door(s) during their entire rotation. Thus, once a door has been rotated over-center, conventional powering mechanisms allow it to free fall down and possibly be damaged upon impact with the outer sidewall of the container. Another problem with prior flip tops having flexible covers is that the covers have a tendency to twist or flex during deployment and is susceptible to lifting off the container rim when the cover is supposed to be closed over the container.

One significant limitation of prior flip top cover systems is that they are generally limited to right hand or left hand action. In other words, the cover will pivot from only one side or the other of the transfer trailer. If it is desired to change the opening side of a prior flip top, it has been necessary to swap components of the cover deployment mechanism.

What is needed is a flip top cover system that eliminates the negative aspects of prior cover system designs. In particular, a flip top that avoids the flexing and lift off problems of prior systems is desired. Moreover, a cover system for a transfer trailer that can be readily changed between left and right hand deployment is needed in the art.

SUMMARY OF THE INVENTION

In view of these needs, the present invention provides cover system for an open-topped container having opposite side rails extending along the length of the open top and opposite end rails extending along the ends of the open top. The cover system comprises a support frame having a pair of support members, each adjacent to a corresponding one of the opposite end rails of the container and a cover supported by the support frame and configured to substantially cover the open top of the container. The cover system is pivoted by a continuous drive shaft connected to the support frame and extending between the pair of support members, with pivot mounts connected to the container for rotatably supporting the continuous drive shaft. A drive assembly coupled to the drive shaft is operable to rotate the continuous drive shaft to pivot the cover relative to the open top of the container.

In another aspect of the invention, a cover system comprises a support frame pivotably mounted to the container, the support frame including a pair of support members, each adjacent to a corresponding one of the opposite end rails of the container and each forming a triangular construct. The cover system further includes a cover supported by the support frame and configured to substantially cover the open top of the container, and a drive apparatus operably coupled to the support frame to pivot the support frame relative to the open top of the container.

Another embodiment of the invention resides in a cover system comprising a support frame, a plurality of pivot mounts mountable to the container adjacent one of the opposite side rails and configured to pivotably support the support frame, and a cover supported by the support frame and configured to substantially cover the open top of the container. One feature of this embodiment resides in a drive assembly operable to pivot the support frame relative to the open top of the container, wherein the drive assembly is configured to be operably coupled to the support frame when the support frame is pivotably supported adjacent either of the opposite side rails.

In a further embodiment of the invention, a cover system comprises a support frame pivotably mounted to the container, a cover supported by the support frame and configured to substantially cover the open top of the container, and a drive apparatus operably coupled to the support frame to pivot the support frame relative to the open top of the container. The drive apparatus includes a mounting beam mounted to the container, the mounting beam including a pivot mount at each of the opposite ends of the beam, a hydraulic cylinder pivotably mounted to a pivot mount at one end of the beam and including a piston extendable and retractable at an opposite end of the cylinder, an arm pivotably mounted at one end thereof to a pivot mount at the other of the opposite ends of the beam and including a roller at its opposite end thereof, a track mounted to the support frame, the track configured to receive the roller for translation therein, and a floating link pivotably attached at one end to the piston and at an opposite end to the arm.

DESCRIPTION OF THE PREFERRED EMBODIMENT

Figure 1:
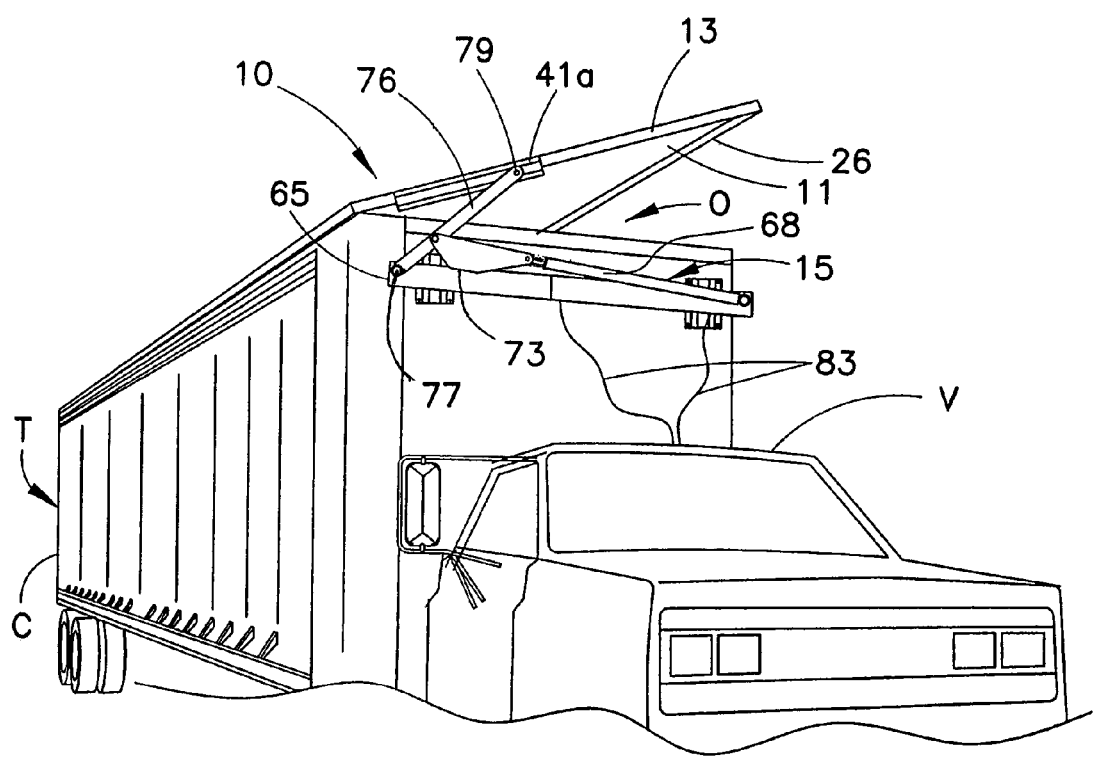
FIG. 1 is a front perspective view of a transfer trailer with a cover system mounted thereon in accordance with one embodiment of the present invention.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

Figure 2:
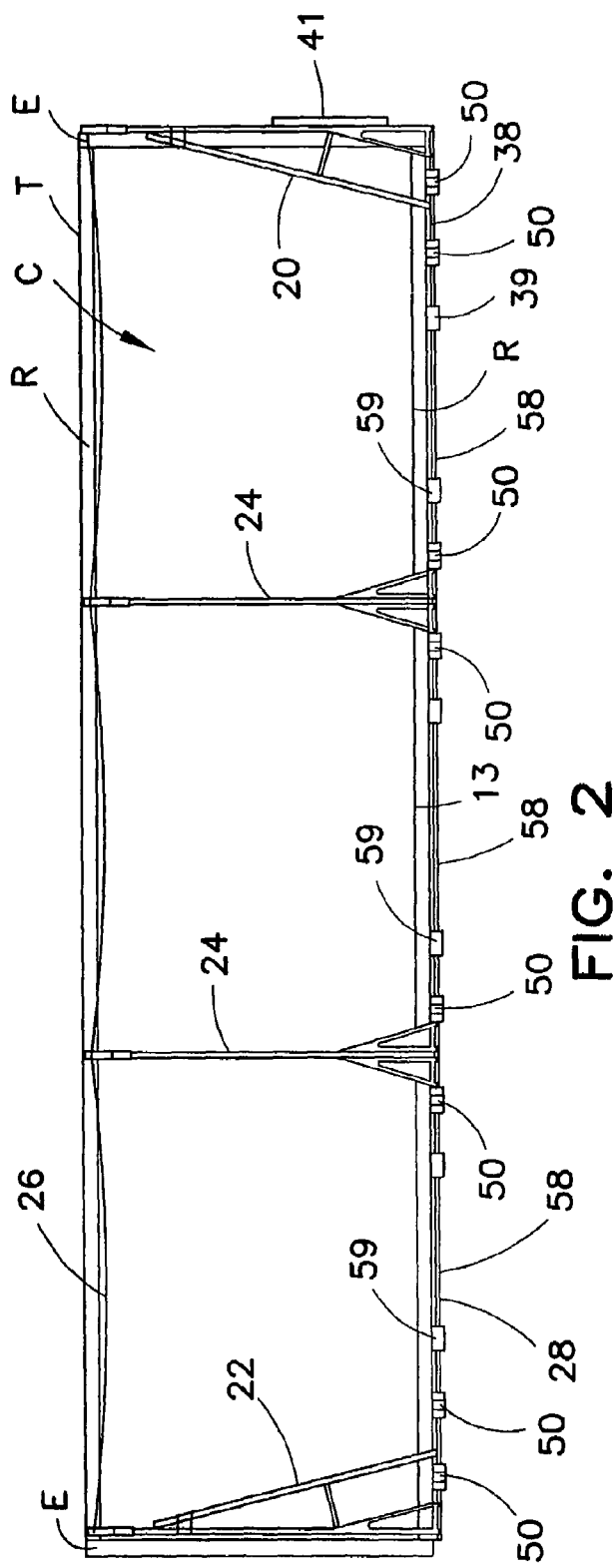
FIG. 2 is a top view of the support frame for the cover system shown in FIG. 1.

Referring to FIGS. 1 and 2, a transfer trailer T is shown having container C with an open top O. The open top is bordered by a top rail that includes opposite side rails R and opposite end rails E. The transfer trailer T can include end doors (not shown) to facilitate discharge of the contents of the container body C. Alternatively, the container body can be configured for side discharge, such as by pivoting the body relative to its length. In the illustrated embodiment, the transfer trailer is towed by a vehicle V, such as the truck shown in FIG. 1. However, the principles of the present invention can be applied to a container that is stationary or a container that is conveyed by some alternate means, such as by rail.

In accordance with the present invention, a cover system 10 is provided that can be opened or closed over the open top O of the container C. The cover system 10 includes a cover 11 that is preferably configured to completely enclose the open top of the container. The cover 11 is preferably formed of a flexible material, such as a tarpaulin or a screen. In a specific embodiment, the cover 11 is a high density polyethylene mesh.

The cover 11 is carried by a support frame 13 that includes a number of support members arranged so that the shape of the cover is generally maintained when deployed over the open top O of the container and when the cover is being retracted. A drive assembly 15 is mounted to the container C and is connected to the support frame 13 to pivot the frame relative to a side rail R of the container.

One feature of the invention resides in the design of the support frame 13, depicted in FIG. 2, that significantly reduces the twisting or flexing of the cover 11 when deployed or during deployment. The support members of the support frame include a front swing arm assembly 20 and a rear swing arm assembly at the opposite longitudinal or lengthwise ends of the cover and container. A pair of intermediate swing arm assemblies 24 are set apart in the middle portion of the cover to add support for the cover 11. A tension cable 26 is coupled intension to the front and rear swing arms 20, 22 in a known fashion. The tension cable can pass through eyelets or sleeves at the free end of the cover 11, in a conventional manner, so that the cable 26 can keep the cover taut across the swing arm assemblies 20, 22 and 24. Keeping the cover taut prevents it from drooping into the payload of the container C and also helps resist flapping as wind passes over the cover system during highway travel. Moreover, if the cover 11 is kept sufficiently tight, it can essentially seal against the side rails R of the container to keep the container contents in the container and wind and foreign objects out of the trailer.

Figure 4:
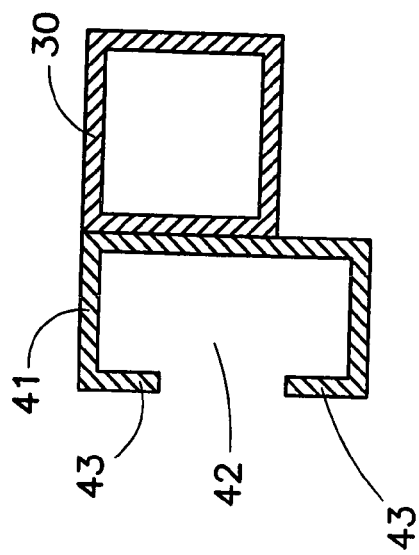
FIG. 4 is an enlarged end cross-sectional view of a portion of the front swing arm assembly illustrated in FIG. 3.
Figure 3:
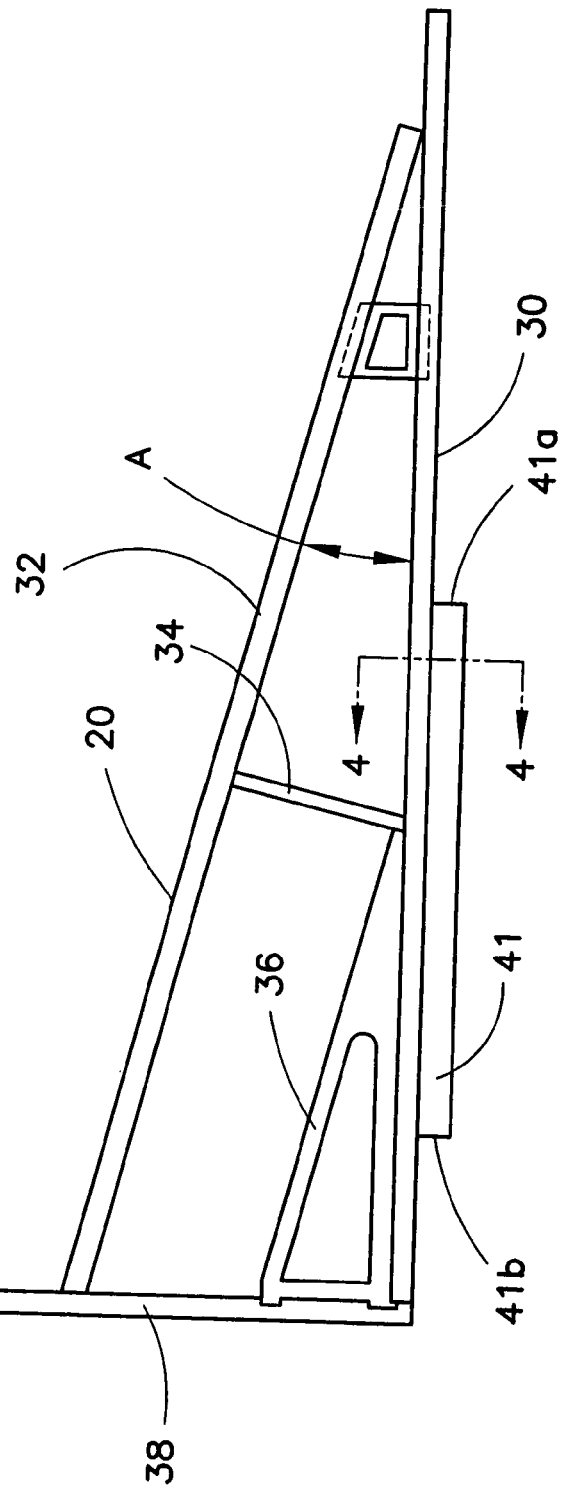
FIG. 3 is a top elevational view of a front swing arm assembly forming part of the support frame depicted in FIG. 2.
Figure 5:
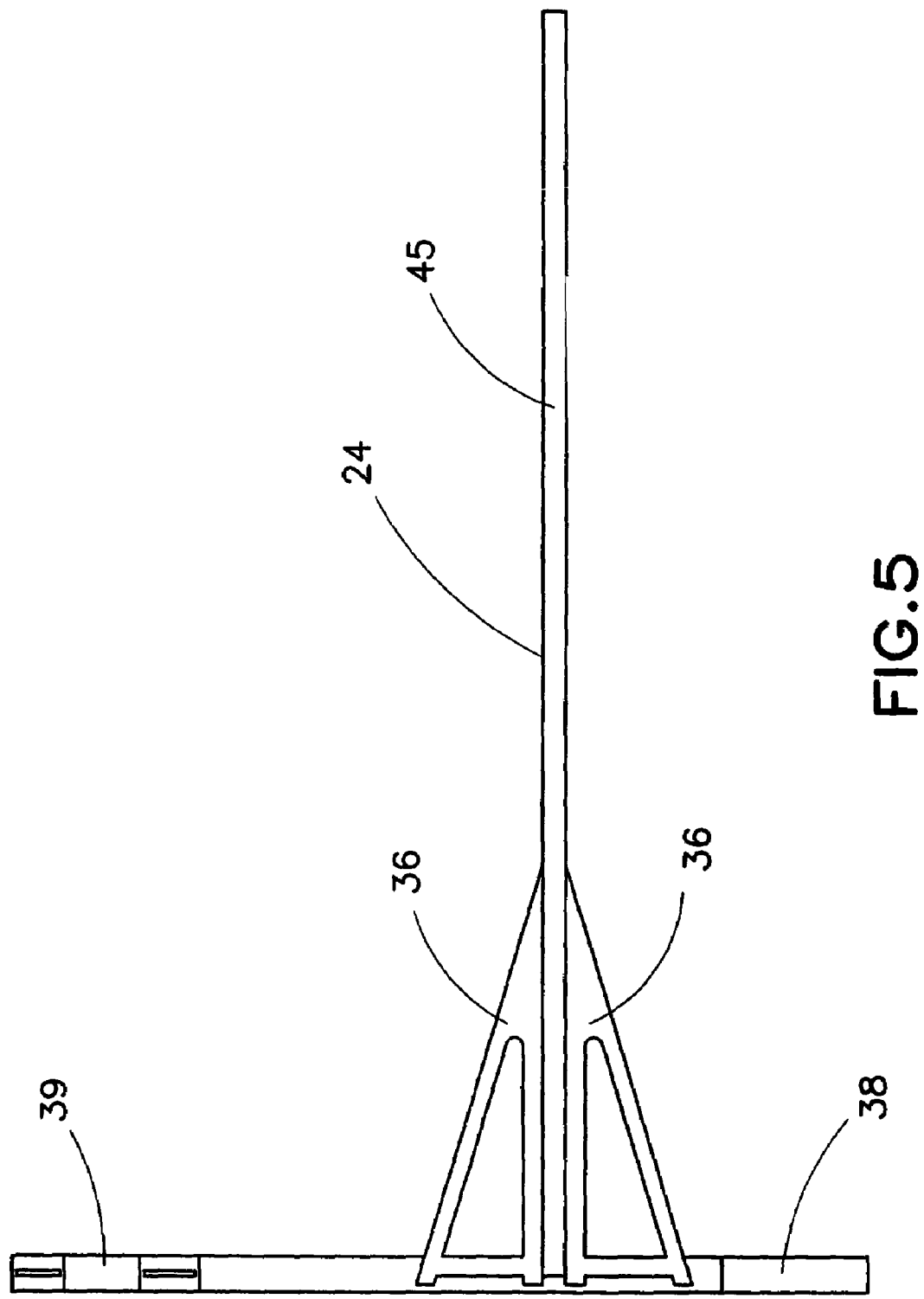
FIG. 5 is a top elevational view of an intermediate swing arm assembly forming part of the support frame depicted in FIG. 2.

Details of the swing arm assemblies are shown in FIGS. 3–5. The front swing arm assembly 20, shown in FIG. 3, includes a front beam 30, which can be in the form of a box beam, as shown in FIG. 4. In one important feature of the invention, a triangle beam 20 intersects the front beam 30 at an angle A. In a specific embodiment, the angle A can be 15–20°. A strut 34 spans between intermediate portions of the two beams 30, 32 and is preferably oriented at a right angle to the triangle beam 32. A gusset 36 is attached to one end of the front beam 30. Preferably, all of the beams are connected by welding.

The front beam 30, triangle beam 32 and gusset 36 are each attached to a drive shaft segment. Again, these components are preferably welded together. As shown in FIG. 2, the cover system includes a drive shaft assembly 28 that spans the fore-aft length of the cover 11. The drive shaft assembly 28 can constitute a single drive shaft extending along the entire container length. However, the shaft assembly is preferably formed of a number of shaft segments, such as the segment 38 in FIG. 3, which are connected to form essentially a single drive shaft. In the preferred embodiment, each shaft segment is provided with a coupling or splicer 39 that can be in the form of a hollow tube welded at its ends to opposite shaft segments. As shown in FIG. 2, the cover system of the illustrated embodiment includes a shaft segment 38 associated with each of the swing arm assemblies and intermediate shaft segments 58 between the swing arm assemblies. The intermediate shaft segments 58 also include splicers 59 at one end so that the shaft segments 58 can be attached to the shaft segments affixed to the swing arm assemblies.

Returning to FIGS. 3 and 4, the front swing arm assembly includes a roller track 41 mounted to the front beam 30. As shown in FIG. 1, this roller track provides the interface with the drive assembly 15, as will be explained in more detail herein.

The rear swing arm assembly 22 is essentially the mirror image of the front assembly. The rear assembly 22 need not include a roller track 41; however, in embodiments where the cover system is "reversible", both front and rear swing arm assemblies can include a roller track 41 so that the support frame 13 can be reversed to permit pivoting from the right side of the container, rather than the left side as shown in FIGS. 1 and 2.

The intermediate swing arm assemblies 24 can include an intermediate beam 45 that is sized to span across the width of the container C. A pair of gussets 36 can flank the sides of the intermediate beam 45. All of these components can be attached to a drive shaft segment 38. The drive shaft segment 38 includes a splicer 39, as described above. The free ends of the intermediate beams 45 can be provided with eyelets (not shown) to receive the tension cable 26. The free ends of the front and rear swing arms can also be provided with similar eyelets, with the cable tension being maintained by a turnbuckle or similar arrangement connected to the cable ends.

The triangle construct for the front and rear swing arm assemblies represent a significant improvement over prior systems. The triangular construct replaces the "ladder construct" associated with prior systems. These "ladder constructs" require a ladder beam arrangement along the length of both sides of the cover. Not only do these ladder constructs add material and weight, they also fail to prevent significant twisting of the cover as it is being deployed or retracted. In contrast, the triangle construct of the present invention substantially prevents twisting of the cover along its length, while reducing the material requirements and weight relative to the prior systems.

Another important feature of the cover system 10 of the present invention is the provision of a continuous drive shaft along the length of one side of the cover 11. As shown in FIG. 2, this drive shaft is formed from several drive segments that are preferably welded together when the cover system is installed on a transfer trailer T. This segmented approach facilitates installation of the system, since a single 40+foot long bar need not be manipulated to complete the system assembly. The continuous drive shaft improves the torsional rigidity of the cover 11 and helps to ensure that the rear of the cover 11 pivots at substantially the same rate as the front of the cover.

In prior systems, only the front of the cover is pivoted by the drive assembly, with the remainder of the cover expected to follow due to tension in the cover itself or force transmission through the "ladder construct". With these prior systems, the rear of the cover can lag the degree of pivoting of the front by as much as 30°, resulting in the rear portion slamming to its open or closed position well after the front end drive has ceased.

With the present invention, the continuous drive shaft transmits substantially the same torque to each swing arm assembly 20, 22 and 24 along the entire length of the cover 11 (reduced of course by the minimal twist of the drive shaft itself). Since the drive shaft assembly 28 in the preferred embodiment is segmental, large diameter drive shaft segments 38 and 58 can be utilized as needed to reduce the amount of twist along the length of the drive shaft. In a specific embodiment, the shaft segments 38, 58 have a diameter of 1.5 inches.

Figure 7:
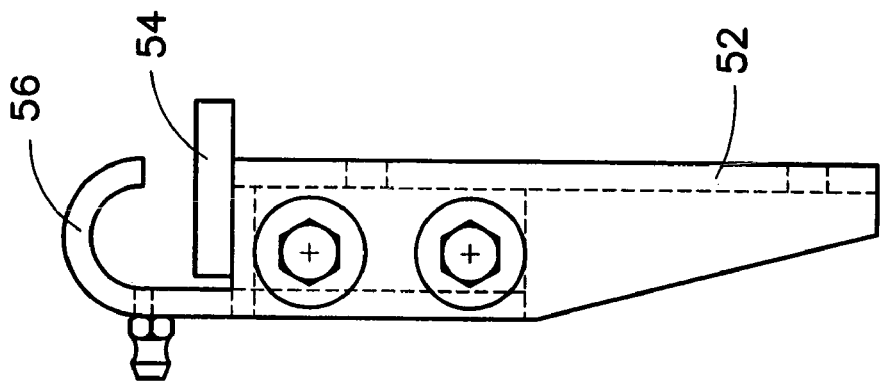
FIG. 7 is a side view of the hinge assembly shown in FIG. 6.
Figure 6:
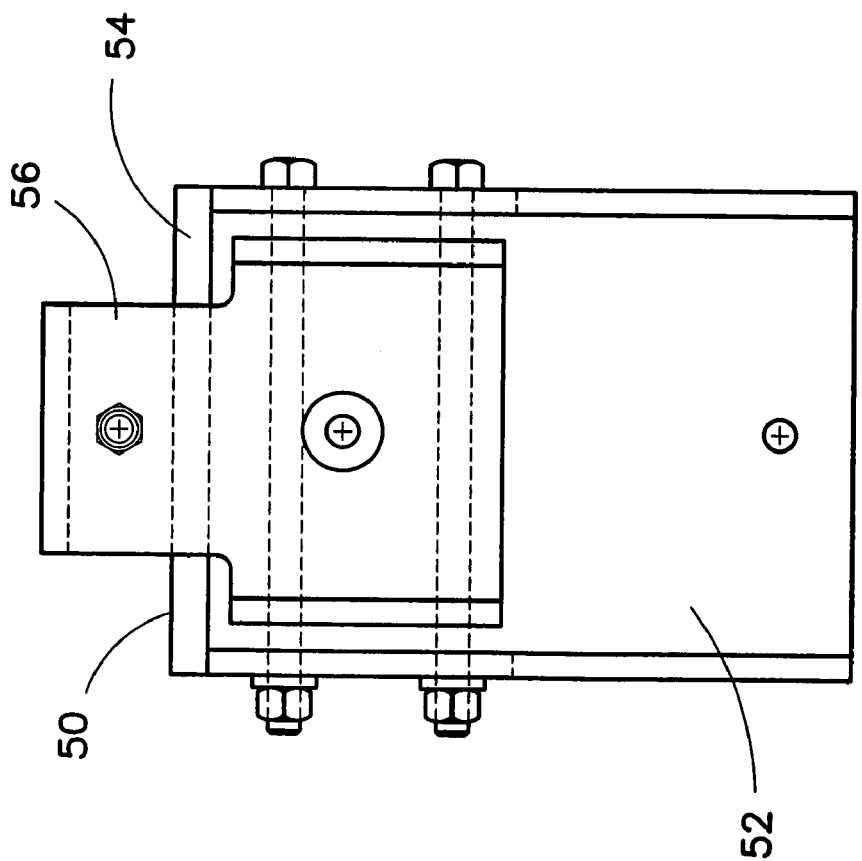
FIG. 6 is front view of a hinge assembly forming part of the cover system shown in FIG. 1
Figure 9:
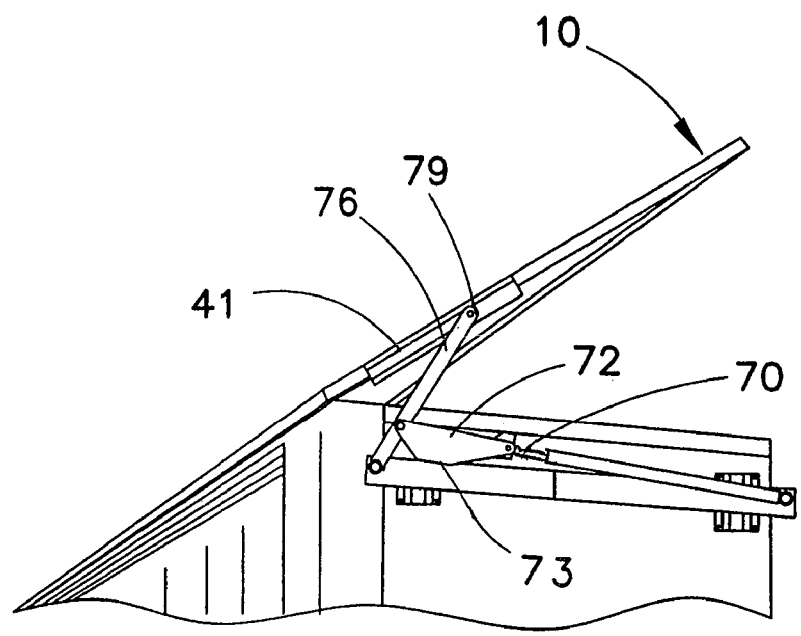
FIG. 9 is a partial front perspective view of the transfer trailer shown in FIG. 1, with the cover system in a partially deployed position.

As shown in FIG. 2, the drive shaft assembly 28 is rotatably mounted to a side rail R of the container C by a number of positionable hinge assemblies 50. Details of the hinge assemblies 50 can be seen in FIGS. 6 and 7. Each hinge assembly includes a mounting plate 52 that can be bolted to the container or side rail R at any location along the length of the container. In a preferred arrangement, a hinge element is positioned to support the drive shaft assembly 28 just adjacent a truss 36 of each swing arm assembly 20, 22 and 24. This arrangement helps ensure smooth pivoting of each swing arm assembly, without any bending of the drive shaft segment at that location.

The hinge assembly 50 includes a base plate 54 that rests on the side rail R when the hinge assembly is mounted to the container. A hinge hook 56 is adjustably mounted to the mounting plate 52. Each drive shaft segment is supported between the base plate 54 and hinge hook 56 so that the shaft segment can freely rotate.

Figure 8:
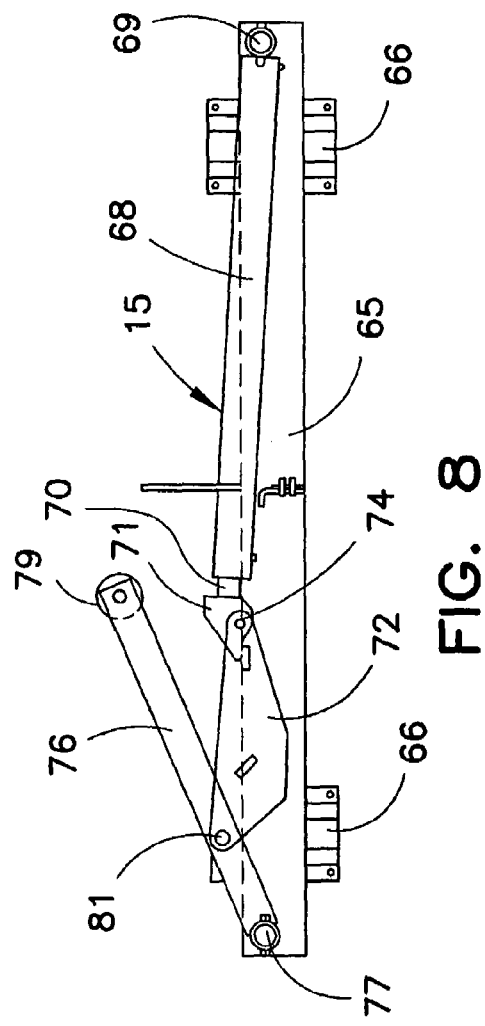
FIG. 8 is an end view of a drive assembly for the cover system illustrated in FIG. 1.

The details of the drive assembly 15 can be discerned from FIG. 8. The drive assembly includes a mounting beam 65 that is configured to support the assembly on the front end rail E or the body of the container C. The mounting beam includes a pair of mounting plates 66 that permit bolting the assembly to the container. The drive assembly 15 includes a cylinder 68 that is pivotably mounted at one end to the mounting beam 65 at a pivot mount 69. The cylinder 68 includes an extendable and retractable piston 70 that terminates in a coupling element 71. The coupling element 71 is connected to a floating link 72 at a pivot connection 74. The floating link 72 includes another pivot connection 81 that is connected to a flip arm 76. The flip arm 76 is pivotably mounted at one end to a pivot mount 77 on the mounting beam 65. The floating link 72 is connected to the flip arm in the lower half of the arm adjacent the pivot mount 77.

The free end of the flip arm 76 carries a roller 79 that is configured to travel within the roller track 41 mounted to the cover support frame 13. The roller 79 is sized to fit within the channel 42 defined by the flanges 43 of the roller track 41. As shown in FIGS. 1 and 2, the roller track spans a limited portion of the front beam 30. The ends of the roller track 41 can be closed to prevent dislodgement of the roller 79. The length of the roller track is determined by the amount of travel for the roller 79, which in turn is established by the length of the flip arm 76 and the location of its pivot mount 77. In a specific embodiment, the pivot mount 77 is located less than 15 inches from the top of the container end rail E. The flip arm has a length of about 40 inches, while the roller track is about 34 inches in length.

The movement of the drive assembly to pivot the cover 11 from its nearly closed position shown in FIG. 1 to its fully retracted position is depicted in FIGS. 9–13. When the cover 11 is fully closed, the roller 79 is nearly at the end 41a (see FIGS. 1 and 3) of the roller track 41. In addition, the piston 70 is at its fully retracted position within the cylinder 68, as shown in FIG. 8. As the piston is extended from the cylinder, the piston pushes the floating link 72. It can be noted that at least initially the line of force between the pivot attachment point 74 for the piston 70 and the pivot attachment point 81 for the flip arm 76 is generally parallel to the line of action of the piston 70. Thus, when the piston is initially extended, the floating link 72 moves linearly in line with the piston, as can be seen by comparing FIGS. 1, 9 and 10.

Figure 10:
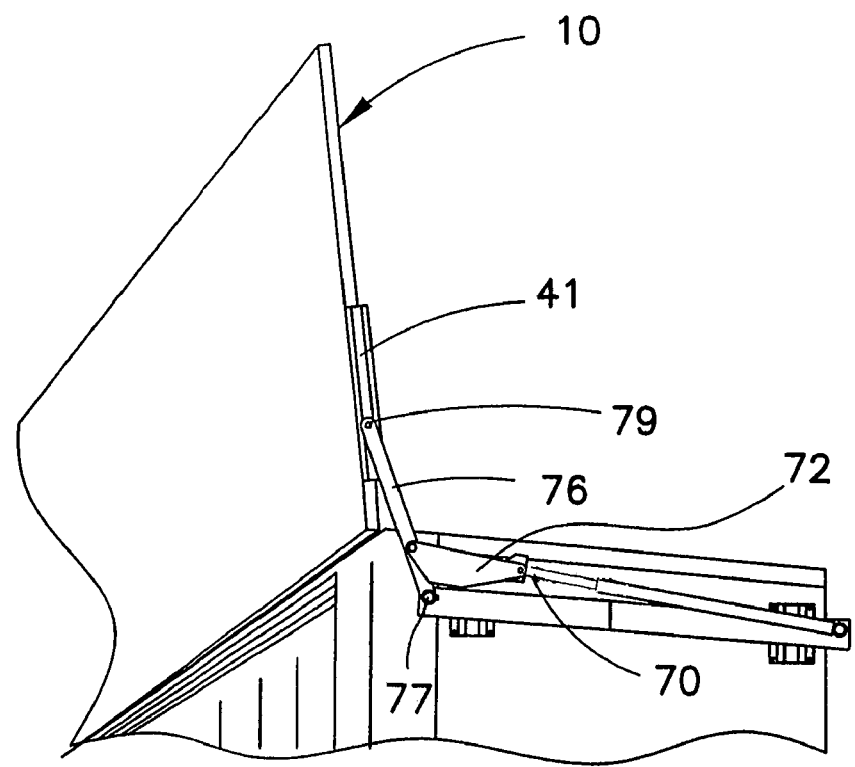
FIG. 10 is a partial front perspective view of the transfer trailer shown in FIG. 9, with the cover system in further partially deployed position.

As the piston is extended, the floating link 72 pushes on the flip arm 76, which pivots about its pivot mount 77. The distance of the pivot attachment 81 from the pivot mount 77 provides a mechanical advantage as the extension force of the piston 70 is converted into a pivoting motion for the cover 11 and support frame 13. As the flip arm 76 pivots, the roller 79 moves away from the end 41a, as can be seen by comparing FIG. 1 with FIG. 9. As the piston extends further, the roller 79 approaches the opposite end 41b of the roller track 41, as shown in FIG. 10. At this point, the floating link 72 is still generally parallel to the piston 70.

Figure 11:
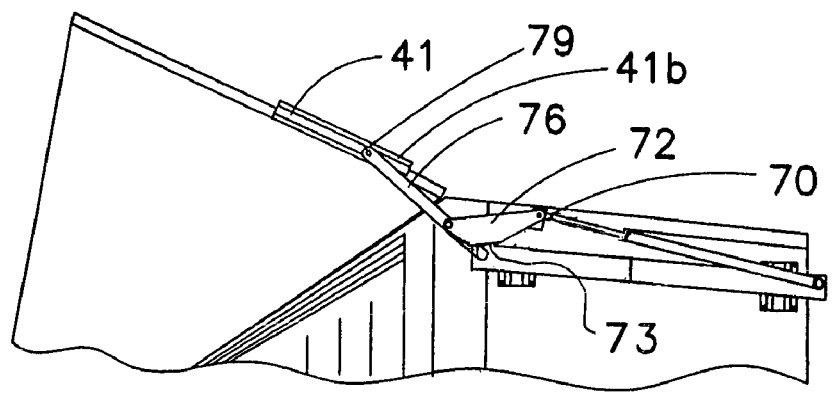
FIG. 11 is a partial front perspective view of the transfer trailer shown in FIG. 10, with the cover system in its approximately halfway deployed position.
Figure 12:
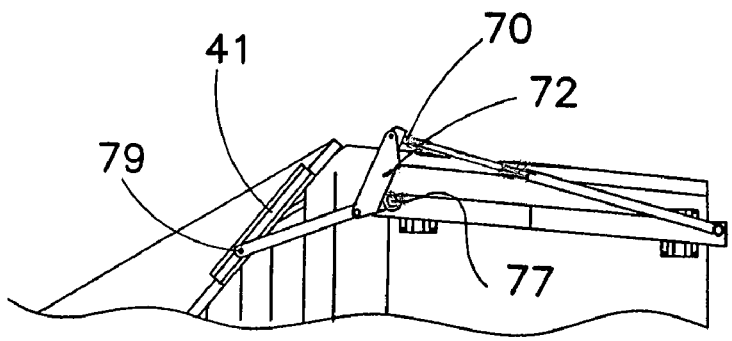
FIG. 12 is a partial front perspective view of the transfer trailer shown in FIG. 11, with the cover system in a nearly fully retracted position.
Figure 13:
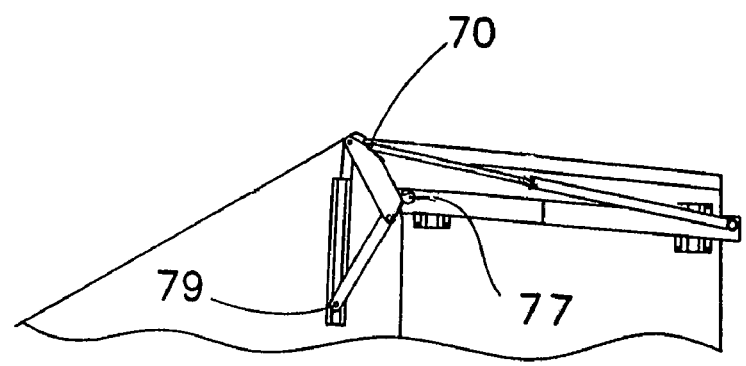
FIG. 13 is a partial front perspective view of the transfer trailer shown in FIG. 12, with the cover system in its fully retracted position.

As the piston strokes farther, the floating link 72 begins to pivot downward, in concert with the downward pivoting of the cover 11, as seen in FIG. 11. At this point, the roller 79 is situated at the end 41b of the roller track 41. In this position, the drive assembly 15 is not only operating to retract the cover, it is also acting to control the downward movement of the cover and support frame. In other words, the roller 79 and flip arm 76 help restrain the movement of the cover when the roller 79 engages the end 41b of the roller track.

As the piston 70 extends farther, the floating link 72 moves from a "pusher" to a "pivoter". In particular, the lower edge 73 of the floating link contacts the pivot mount 77. It can be noted that the pivot mount 77 can constitute a post that projects from the mounting beam 65, extending past the flip arm 76 to provide a surface against which the lower edge 73 of the floating link can pivot. Thus, as the piston extends from the position shown in FIG. 11 to the position shown in FIG. 12, the floating link pivots about the pivot mount 77. This pivoting motion pulls the flip arm 76 down, which thus pulls the cover down. As the cover continues to pivot downward, the roller travels away from the end 41b, until it ultimately reaches end 41a again when the cover is in its fully retracted position shown in FIG. 13.

It can be appreciated that the use of the floating link and the interface between the floating link 72 and the pivot mount 77 provides for a well controlled pivoting of the cover 11 and support frame 13. Reversing the movement of the piston 70—i.e., retracting the piston into the cylinder—essentially reverses the movements described above until the cover 11 rests on top of the container C.

The present invention provides the benefit that the drive assembly 15 can be reversed when the cover 11 and support frame 13 is reversed. In other words, the cover system can be changed from a left side mount to a right side mount arrangement. Reversing the drive assembly only requires swapping the pivot mounts to which the cylinder 68 and flip arm 76 are connected. The pivot attachments 74, 81 for the floating link 72 need not be disturbed. In order to preserve the manner of movement of the floating link, the pivot mount 69 is configured like the pivot mount 77 so that the lower edge 73 of the floating link can contact the pivot mount 69 when the cover system is a right side mounted system.

In a further feature of the present invention, the cylinder 68 is a hydraulic cylinder. Moreover, this cylinder includes hydraulic hoses 83 (FIG. 1) that can be connected to the hydraulic system for the transfer trailer. Preferably, the hoses are connected to the trailer hydraulics through a hydraulic motor (not shown) that can control the hydraulic pressure and flow rate to and from the cylinder 68. The hydraulic motor can be controlled by the user or can preferably be adapted for "one touch" operation, meaning that the user can activate the system by flipping a single switch. The switch can determine forward or reverse pivoting (i.e., deploying or retracting). The hydraulic motor can be configured to automatically shut off when the cover has reached the limits of its travel. These limits can be sensed hydraulically by an increase in hydraulic pressure when the drive apparatus 15 can move no farther, or can be controlled by properly positioned limit switches.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

What is claimed is:

1. A cover system for an open-topped container having opposite side rails extending along the length of the open top and opposite end rails extending along the ends of the open top, the cover system comprising:
   a support frame pivotably mounted to the container;
   a cover supported by said support frame and configured to substantially cover the open top of the container; and
   a drive apparatus operably coupled to said support frame to pivot said support frame relative to the open top of the container, said drive apparatus including;
   a mounting beam mounted to the container;
   an actuator pivotably mounted to a pivot mount at a first end of said beam and including a piston extendable and retractable at an opposite end of said actuator;
   an arm pivotably mounted at one end thereof to a pivot mount at a second end of said beam and including a roller at its opposite end thereof;
   a track mounted to said support frame, said track configured to receive said roller for translation therein; and
   a floating link pivotably attached at one end to said piston and at an opposite end to said arm, wherein the attachment to said piston is the only attachment at said one end of said floating link.

2. The cover system according to claim 1, wherein the actuator is a hydraulic cylinder.

3. The cover system according to claim 2, in which the container is a transfer trailer and wherein said hydraulic cylinder is connected to the hydraulic system of the transfer trailer.

4. The cover system according to claim 1, in which said floating link has generally trapezoidal construction.

5. The cover system according to claim 1, wherein said floating link has at least one edge configured to contact the pivot mount at the second end of said mounting beam.

6. A drive apparatus for pivoting a cover of an open topped container comprising:
   a mounting beam mounted to the container;
   an actuator pivotably mounted to a pivot mount at a first end of said beam and including a piston extendable and retractable at an opposite end of said actuator;
   an arm pivotably mounted at one end thereof to a pivot mount at a second end of said beam and including a roller at its opposite end thereof;
   a track mountable to the cover, said track configured to receive said roller for translation therein; and
   a floating link pivotably attached at one end to said piston and at an opposite end to said arm, wherein the attachment to said piston is the only attachment at said one end of said floating link.

7. The drive apparatus according to claim 6, in which said floating link has generally trapezoidal construction.

8. The drive apparatus according to claim 6, wherein said floating link has at least one edge configured to contact the pivot mount at the second end of said mounting beam.

9. The drive apparatus according to claim 6, wherein the actuator is a hydraulic cylinder.

10. A drive apparatus for pivoting a cover of an open topped container comprising:
    a mounting beam mounted to the container;
    an actuator pivotably mounted to a pivot mount at a first end of said beam and including a piston extendable and retractable at an opposite end of said actuator;
    an arm pivotably mounted at one end thereof to a pivot mount at a second end of said beam and including a roller at its opposite end thereof;

a track mountable to the cover, said track configured to receive said roller for translation therein; and a floating link pivotably attached at one end to said piston and at an opposite end to said arm, wherein said floating link defines an edge between said one end and said opposite end configured for contacting the pivot mount at the second end of said mounting beam.

11. The drive apparatus of claim 10, wherein said floating link has generally trapezoidal construction.

12. The drive apparatus of claim 10, wherein the actuator comprises a hydraulic cylinder.

13. The drive apparatus of claim 12, wherein:

the container is a transfer trailer and wherein said hydraulic cylinder is connected to the hydraulic system of the transfer trailer.

* * * * *